W. R. MULOCK.
FOUNTAIN PEN.
APPLICATION FILED JULY 20, 1910.

996,937.

Patented July 4, 1911.

Witnesses:-

Inventor:-
William Redford Mulock
By:- Peirce, Fisher & Clapp
Attys:-

UNITED STATES PATENT OFFICE.

WILLIAM REDFORD MULOCK, OF WINNIPEG, MANITOBA, CANADA.

FOUNTAIN-PEN.

996,937. Specification of Letters Patent. Patented July 4, 1911.

Application filed July 20, 1910. Serial No. 572,835.

*To all whom it may concern:*

Be it known that I, WILLIAM REDFORD MULOCK, a citizen of the Dominion of Canada, and a resident of Winnipeg, Province of Manitoba, Dominion of Canada, have invented certain new and useful Improvements in Fountain-Pens, of which the following is a full, clear, and exact description.

The invention relates to fountain pens and seeks to provide an improved joint for connecting the barrel and nib-holder, which will effectively prevent the leaking of the ink from the pen.

The invention consists in the features of improvement hereinafter set forth, illustrated in the preferred form in the accompanying drawing and more particularly pointed out in the appended claim.

Figure 1:
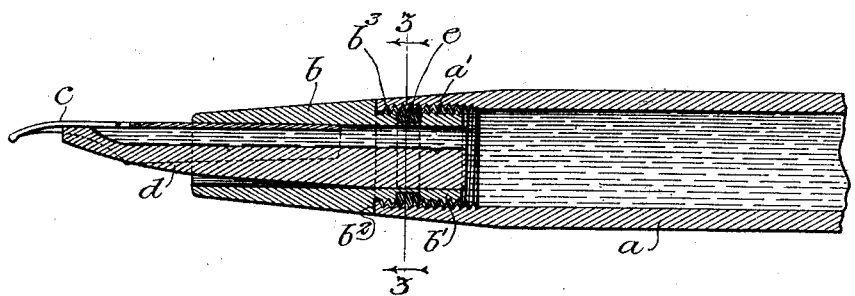
Figure 2:
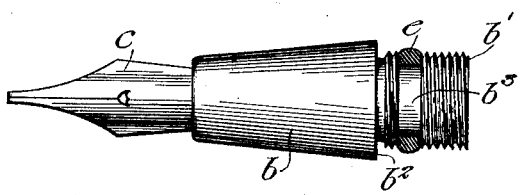
Figure 3:
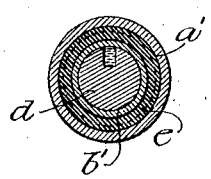

In the drawing, Figure 1 is a longitudinal section of the nib end of a fountain pen with the present improvement applied thereto. Fig. 2 is a plan view of the nib-holder with the soft rubber washer thereon shown in section. Fig. 3 is a cross section on the line 3—3 of Fig. 1.

The fountain pen illustrated comprises, as usual, a barrel $a$ and a nib-holder $b$ of suitable construction. These parts are connected by a screw-threaded joint comprising a reduced, externally threaded portion $b'$ adapted to be inserted within the open end of the barrel $a$ and engage the internally threaded portion $a'$ thereof. The shoulder $b^2$ of the nib-holder is adapted to abut against the end of the barrel in the usual manner. The nib-holder shown carries a nib $c$ and a feeding device $d$ which may be of any suitable or usual construction.

To effectively prevent the leaking of ink from the pen, one of the screw-threaded portions is provided with a recess and a soft rubber washer is seated in the recess and is so arranged that the threads of the other portion are embedded therein when the barrel and nib-holder are connected. In the preferred form shown, the reduced externally threaded portion $b'$ of the nib-holder is provided with a recess $b^3$ within which is seated a soft rubber washer $e$. This washer is of such size that, when the threaded stem $b'$ of the nib-holder is screwed into the barrel $a$ to close the open end thereof, the internal threads of the barrel will be embedded in the washer, as shown in Fig. 1, to effectively prevent any leaking at the screw joint between the parts.

Preferably, the washer $e$ is of such size, that, when the nib-holder is withdrawn, it projects beyond the external threads on the portion $b'$ so that when the parts are connected, the soft rubber washer is compressed between and firmly engages the adjacent walls of the barrel and nib-holder to prevent any leaking. Preferably also, the recess $b^3$ is deeper than the recess between the external threads on the stem $b'$ of the nib-holder, so that the rubber washer is securely held against displacement. The soft rubber washer is of course elastic and may be placed in position within the recess $b^3$ by slipping it over the end of the stem $b'$. When once in position, however, it is securely held against external displacement.

It is obvious that the specific details set forth may be varied without departure from the essentials of the invention as defined in the claim.

I claim as my invention:—

In a fountain pen, a barrel having an internally threaded open end, a nib-holder having a reduced externally threaded portion for engaging the internal threads at the open end of said barrel, the externally threaded portion of said nib-holder being provided with an annular recess, and a soft rubber washer seated in said recess and projecting beyond the adjacent threads to engage the internal threads at the open end of the barrel when the nib-holder is connected thereto, substantially as described.

WILLIAM REDFORD MULOCK.

Witnesses:
 EDWIN BEAVEN LINDSAY,
 GLADYS HENRIETTA ALDER.

Copies of this patent may be obtained for five cents each, by addressing the "Commissioner of Patents, Washington, D. C."